United States Patent [19]
Fend

[11] 3,829,062
[45] Aug. 13, 1974

[54] DEFORMABLE SEALING RING ARRANGEMENT

[75] Inventor: Heinrich Fend, Buchs, Switzerland

[73] Assignee: VAT Akiengesellschaft fur Vakuum-Apparate-Technik, Haag, Switzerland

[22] Filed: Sept. 13, 1972

[21] Appl. No.: 288,825

[30] Foreign Application Priority Data
Oct. 10, 1971  Switzerland................. 14730/71

[52] U.S. Cl. ........................ 251/332, 251/334
[51] Int. Cl. ............................... F16k 25/00
[58] Field of Search............... 251/333, 334, 332

[56] References Cited
UNITED STATES PATENTS
862,967   8/1907   Hawkyard ................. 251/333
1,228,048 5/1917   Rich ........................ 123/193 P FOREIGN PATENTS OR APPLICATIONS
562,209    11/1957  Belgium ...................... 251/333
1,081,174  6/1954   France ........................ 251/333

Primary Examiner—Arnold Rosenthal
Attorney, Agent, or Firm—Sughrue, Rothwell, Mion, Zinn & Macpeak

[57] ABSTRACT

An annular, undercut groove in the upper edge of a circular members carries a deformable sealing ring having a central rib projecting between opposite shoulders of the groove defined by the undercuts. Rigid enclosing rings surround the rib on both sides, bear against the shoulders, and fit into grooves in the sealing ring. When a flat member is pressed over the sealing ring the enclosing rings create an expansive pressure throughout the sealing ring, thus urging the central rib against the flat member and urging the enclosing rings against the shoulders.

6 Claims, 5 Drawing Figures

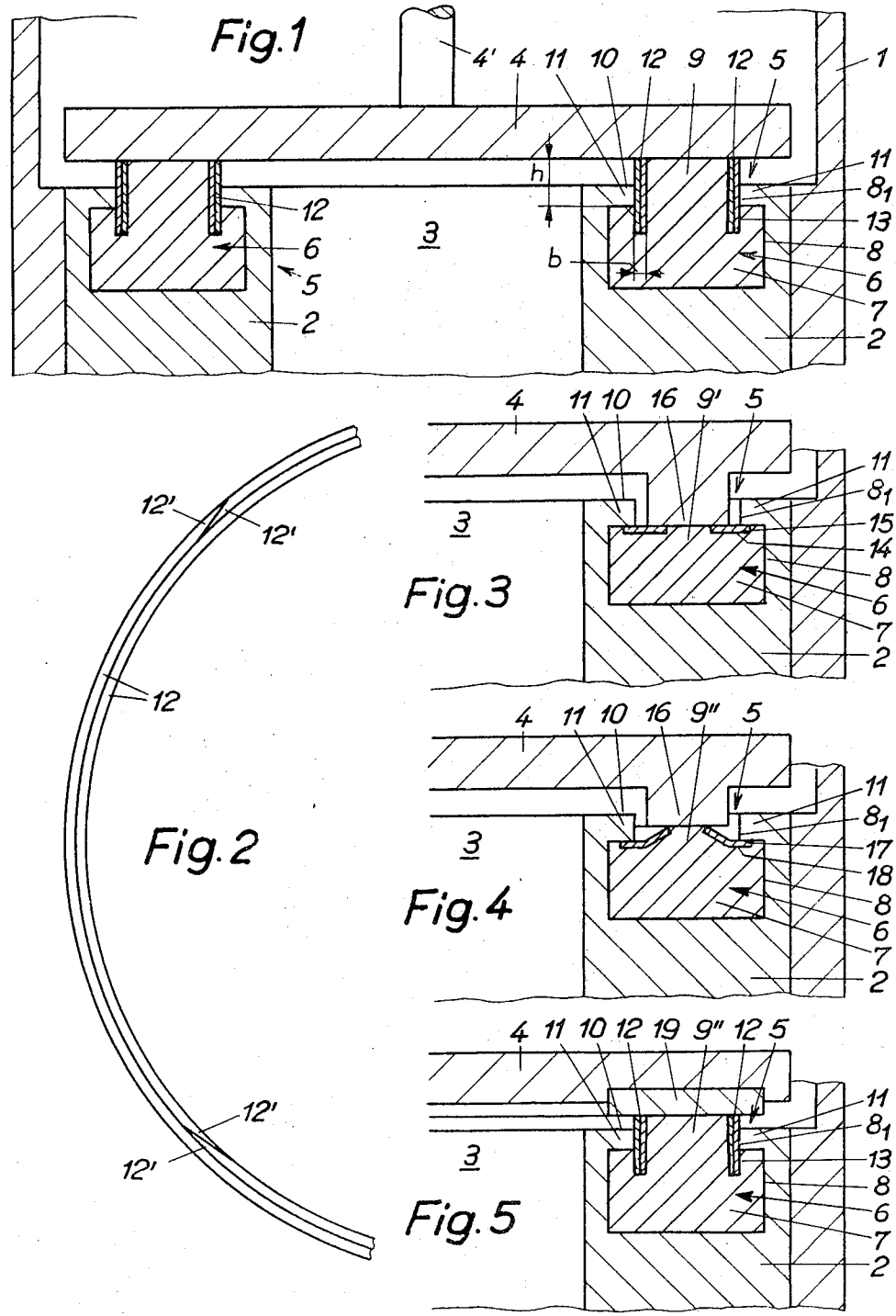

DEFORMABLE SEALING RING ARRANGEMENT

BACKGROUND OF THE INVENTION

1. Field of the Invention

The invention relates to a sealing device on a high vacuum device having two parts which are to be sealed, said high vacuum device comprising a sealing ring which is disposed in an annular T-slot in the first of these parts and which has a central area on its side facing the second part which presses against said part.

2. Description of the Prior Art

In the case of a known sealing device of this type (see German Offenlegungsschrift No. 1,650,471. 5–12) the central area on the side of a soft metal sealing ring facing the second part to be sealed is defined by two annular elastic lips, on the free ends of which this second part presses.

This purpose of this device, i.e., to obtain good sealing with relatively low closing forces is practically never achieved or never with sufficient reliability since the elastic lips are not able to cope with the forces constantly acting on them, i.e., with the constant opening and closing of valves sealed in this way. It is also very difficult to produce suitable lips. If the lips are too rigid or too pliable the device is unusable and furthermore the seal obtained is very sensitive to changes in contact pressure.

SUMMARY OF THE INVENTION

These disadvantages are avoided according to the present invention in that: the soft metal ring has a central rib which is gripped on both sides by at least one enclosing ring on each side consisting of a harder material than the sealing ring and being at least partially disposed in an annular groove on the sealing ring; that the enclosing rings are pressed onto the base of the grooves by the second part to be sealed and thus produce an effective pressure on all sides which presses the enclosing rings against two side ribs narrowing down the T-slot of the first part to be sealed and thus preventing matter from flowing out of the sealing ring at the same.

BRIEF DESCRIPTION OF THE DRAWINGS

The drawing shows embodiments of the subject of the invention in diagrammatic form. In the drawing:

FIG. 1 is a sectional view of a disk valve with an embodiment of the sealing device, FIG. 2 is a detailed view of FIG. 1 on a larger scale, FIGS. 3 – 5 each show a sectional view of other embodiments.

DESCRIPTION OF THE PREFERRED EMBODIMENTS

According to FIG. 1, a slot 3 surrounded by a valve seating 2 is provided in a valve housing 1 consisting, for example, of steel. The slot 3 is also closed by a valve disc 4, which also consists of steel. A sealing device 5 encloses an annular lead packing member 6, which comprises a main part 7 having a rectangular cross section, said main part 7 being housed in a groove 8 of the valve housing 2. The lead sealing member 6 also has a broad central rib 9, which also has a rectangular cross section. This central rib 9 projects out from the groove 8 through a narrowed section $8_1$ of the groove 8. The reduction is produced by two inwardly projecting lateral ribs 11 of symmetrical profile disposed in the immediate proximity of the front surface of the valve seating.

Two pairs of cylindrical enclosing rings 12 of hardened steel are disposed between the lateral ribs 11 and the central rib 9 of the lead packing member. These enclosing rings 12 engage in annular grooves 13 of the main part 6 at the bottom and abut against the valve disc 4 at the top. FIG. 2 shows a plan view of a part of a pair of these rings 12. These rings 12 each consist of an upright steel band bent in a circle. The complementary, chamfered ends 12' of the rings 12 overlap. The overlapping parts 12', 12' of the two adjacent rings 12 are staggered in respect of each other.

The above described sealing device operates as follows:

The closing pressure exerted on the disc 4 by a valve stem 4' is first transferred by the enclosing rings 12 to the main part 7 of the lead packing member 6. On account of its softness this lead packing member 6 behaves approximately in the same way as a very viscous fluid in the sense that a certain "hydrostatic" pressure occurs in all its parts. This pressure tends to press the packing member 6 out of the groove 8 so that the central rib 9 abuts against the valve disc 4 and thus results in excellent sealing. As the upper front surfaces of the rings 12, the profiles of which may be somewhat rounded, abut firmly against the valve disc 4, which presses the rings into the grooves 13, no lead can escape between these front faces and the disc 4. As the pressure also acts radially on the rings 12, these are pressed so firmly against the ribs 11 that lead is also prevented from escaping between the parts 12 and 11. Lastly, the adjacent overlapping ends 12', 12' of the rings 12 are pressed so firmly together that no lead can penetrate outside at the overlapping end parts projecting out of the valve seating.

In principle, a single bordering ring 12 on each side of the central rib 9 would be sufficient. However, two or even three rings 12 are preferable as they are better able to adapt to possible local unevenness of the valve disc 4 by mutual displacement of the rings 12. The width $b$ of the grooves 13, which is equal to the total thickness of two or more superposed rings 12 and the height $h$ of the part of the rings 12 which projects from these grooves 13 are preferably so dimensioned that $b < h < 4b$. Optimum dimensioning depends on the materials which are used for the relatively soft sealing ring 6, the relatively hard seating 2 and the even harder enclosing ring 12 as well as on the mutual friction coefficients of these materials. If the height $h$ is too great the radial pressure on the enclosing rings 12 may produce so much friction between these rings and the lateral ribs 11 that the former do not press firmly enough against the base of the grooves 13 to displace sufficient soft material and thus to obtain greater pressure between the central rib 9 and the disc 4. Soft metals such as tin or indium or even a non-metal such as tetrafluoropolyethylene may be used as material for the sealing ring 6. Aluminum and hardenable aluminum alloys may also be used for the parts 2, 4 and 12.

At a specific circumferential pressure of, for example, 30 kg pro cm of the circumference of the seal an extraordinarily high vacuum tightness of, for example, $10^{-9}$ Torr l/sec. can be obtained with the sealing means described above. Previously this could only be obtained with metal seals at approximately 10 times higher specific circumferential pressures. The valve disc can also be opened and closed as often as desired. In addition, the sealing device may be baked-out (annealed), for example up to ca. 300° C, before being put into operation if lead is used as the soft metal. The sealing device is insensitive to changes in the specific circumferential pressure and is easy to produce.

FIG. 3 shows only a partial sectional view through a disc valve. In the case of this embodiment of a sealing device a soft metal ring 6 is again provided. This ring 6 is housed in a groove 8 of the seating 2. The groove 8 again has a section $8_1$ at the top which is narrowed down by two lateral ribs 11 of the seating 2. The ring 6 again has a central rib 9' above. In this embodiment the rib is only as high as two shallow grooves 14 provided on both sides of the same. A groove is termed shallow if its depth is less than its width. Two level holding rings 15 are disposed in the grooves 14. The edges of these rings 15 are disposed on the one hand under the lateral rib 11 of the seating 2 and on the other hand under a central counter rib 16, which projects downwards from the valve disc. The counter rib 16 lies opposite the central rib 9' of the soft metal ring 6. This counter rib 16 is considerably broader than the central rib 9' so that it transfers the closing pressure of the valve disc via the holding ring 15 onto the soft metal, which is consequently pressed upwards in the central rib 9 and produces an excellent seal on the counter rib 16. The "hydrostatic" pressure presses the relevant edges of the holding rings 15 in an axial direction firmly against the ribs 11 so that no soft metal can escape therebetween. The groove 8 indicated in FIG. 3 also has a rectangular cross section. Apart from easier production, this has no further significance, in contrast to the narrowed down section $8_1$ which is provided in all cases.

FIG. 4 again shows two profilated holding rings 17, which are housed in two shallow grooves 18 of a soft metal ring 6. These grooves 18 enclose a central rib 9" of this ring 6. The rings 17 and the grooves 18 have a slightly bent profile so that the central rib 9" has a conical widening at its base. Otherwise this sealing ring operates in practically the same way as the embodiment according to FIG. 3.

U-shaped profilated enclosing rings having very low upwardly directed U-sides could be housed in a shallow groove. The sealing device according to FIG. 5 differs from that according to FIG. 1 merely in that the valve disc 4 is provided with an insert ring 19, which is disposed opposite the central rib 9" of the soft metal ring 6 and the cylindrical enclosing rings 12 and which projects slightly above the lower surface of the valve disc 4. As a result, the choice of materials for the sealing device is thus facilitated. Enclosing rings 12 consisting of two or more superposed windings of a flat band with wedge-shaped ends, may also be provided.

Although the above sealing devices have been described in connection with valves, it is obvious that they are generally applicable for sealing two parts 2 and 4 which are pressed together. Both parts may be ring-shaped if necessary, for example, the coupling flanges of two high vacuum pipes. Although in practice almost exclusively annular sealing devices are used, it is possible in principle for sealing devices of the above-described type to be constructed with slightly elliptical or even polygonal rings.

What is claimed is:

1. A device for providing a seal between two members, comprising:
   a. means defining a recessed endless groove in a first one of the members, the groove having inwardly projecting shoulders on both sides adjacent the upper portion of the groove,
   b. a sealing ring of relatively soft and deformable material substantially filling the groove and having a central rib lying generally intermediate the shoulders,
   c. means defining a pair of grooves in the sealing ring, each such groove lying generally below a shoulder, and
   d. a pair of enclosing rings disposed on each side of the central rib and at least partially disposed in the grooves in the sealing ring, each enclosing ring bearing against a shoulder and being formed of a material harder than the sealing ring,
   e. a second one of the members being adapted to be pressed against the enclosing rings, whereby the enclosing rings are pressed into the grooves in the sealing ring, thereby creating an outwardly expansive pressure throughout the deformable sealing ring to urge the central rib against the second member and the enclosing rings against the shoulders.

2. A device according to claim 1 wherein the recessed groove, the sealing ring and the enclosing rings are annular, and the enclosing rings exert pressure radially against the shoulders.

3. A device according to claim 2 characterized in that at least two superposed enclosing rings are provided on each side of the central rib.

4. A device according to claim 2 characterized in that the relation between the width b of one of the grooves in the sealing ring and the height h of the portion of the enclosing ring projecting from this groove is $b<h<4b$.

5. A device according to claim 2 characterized in that the second member has an insertion ring disposed opposite the central rib and the enclosing rings.

6. A device according to claim 1 characterized in that each enclosing ring comprises a metal band in an upright position bent to form a ring and having complementary, chamfered, overlapping ends.

* * * * *